INVENTORS.
ARTHUR KORN.
JOSEPH W. HESS.
SIMON RUSKIN.
BY

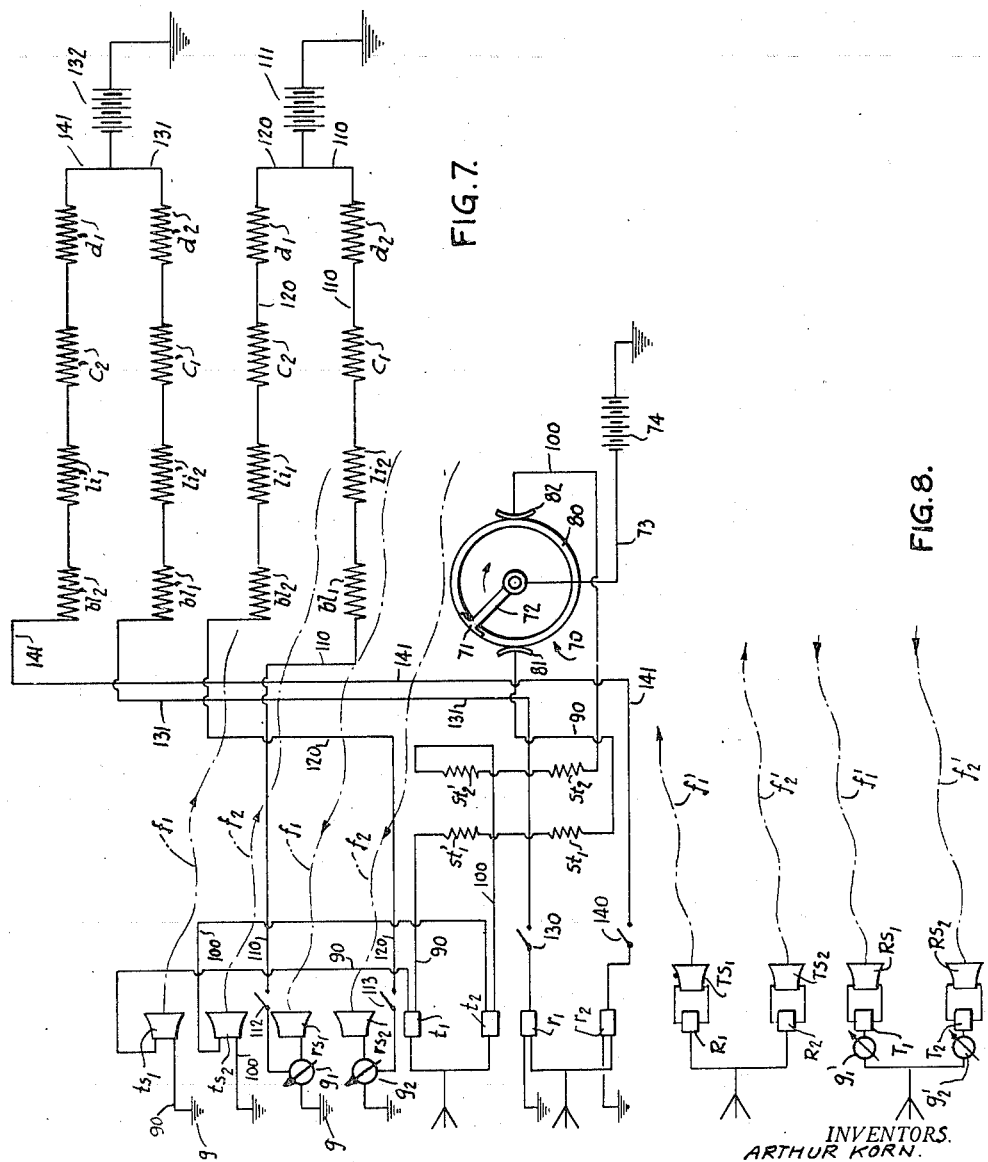

Patented Dec. 25, 1945

2,391,633

UNITED STATES PATENT OFFICE 2,391,633

AUTOMATICALLY OPERATED OBJECT-LOCATING SYSTEM

Arthur Korn, Hoboken, N. J., and Joseph W. Hess and Simon L. Ruskin, New York, N. Y.

Application May 25, 1943, Serial No. 488,394

5 Claims. (Cl. 177—386)

The invention relates to devices utilizing sound waves such as supersonic waves or electric waves for determining the relative position of a reflecting surface in the water, in the air or under the earth, with respect to sources of such waves.

One of the objects of this invention is to provide improvements in devices of the type indicated, whereby the change of the relative position is recorded when either the reflective surface is in motion or the sources of such waves or both.

A further object of the invention is to produce such a record, e. g., for a submarine in full automatic manner with visible marks on a surface provided with a coordinate system determining latitude and longitude of the submarine.

A further object of the invention is to combine the aforesaid automatic recording of the course of a submarine with interpolation of a plurality of measurements by means of sound waves of different frequencies.

The invention is adapted for use in a variety of applications such as the acoustical location and the recording of changes of positions of submarines, the location and recording of changes of positions of targets in air such as airplanes, and the location of certain materials such as oil, coal or ores under the surface of the earth. The invention is of particular advantage for the location and the recording of changes of position of submarines and will therefore be described in detail in said connection. The invention as to its method and operation together with further objects and advantages thereof, may best be understood by reference to the following description taken in connection with the accompanying drawings. In the drawings Fig. 1 is a top view on the sea with two floating observer vessels having mounted thereon the equipment provided in accordance with the invention and a submarine, which has to be located.

Fig. 7 is a schematic diagram of the general arrangement of the equipment in accordance with the invention as mounted on the first observer vessel.

Fig. 8 is a schematic diagram of the general arrangement of the equipment in accordance with the invention as mounted on the second observer vessel.

Figure 1:
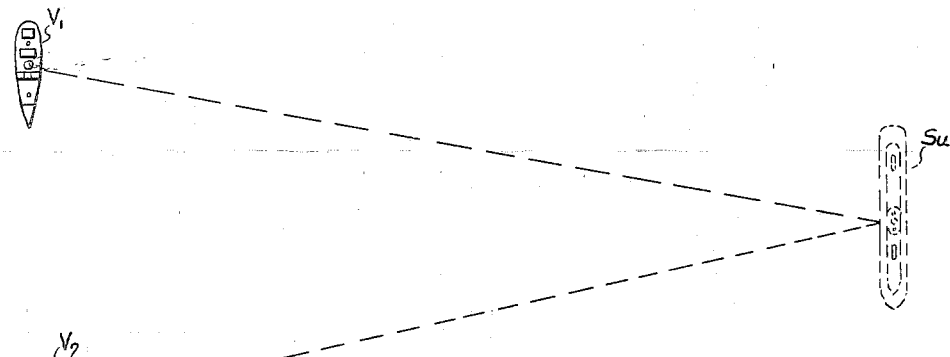

Referring to the drawings in Fig. 1 $V_1$ denotes the first vessel, floating on the surface or under water, provided with an equipment according to the invention. This equipment schematically illustrated in Fig. 7 and Fig. 4 comprises the following main groups of apparatuses:

A group of supersonic sound transmitters $ts_1$; $ts_2$ _____(Fig. 7)

A group of supersonic sound receivers $rs_1$; $rs_2$ _____(Fig. 7)

Wireless transmitters $t_1$; $t_2$ _____(Fig. 7)

Figure 4:
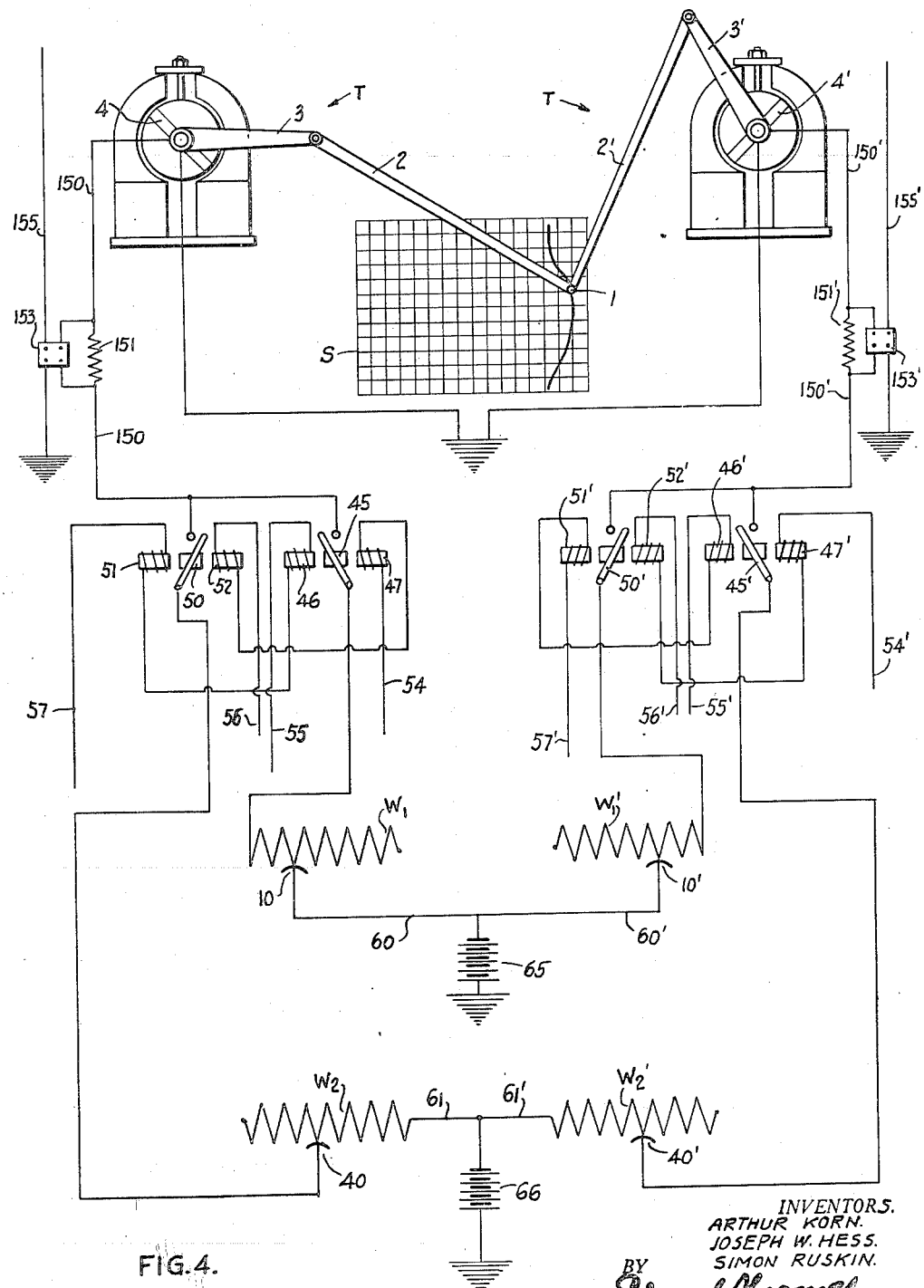
Fig. 4 is a schematic diagram of one example of a device in accordance with the invention by which the record of the course of the submarine is obtained by means of a two component telautograph of known structure.

Wireless receivers $r_1$; $r_2$ _____(Fig. 7)

and a two component telautograph system T (Fig. 4).

$V_2$ denotes the second vessel, floating on the surface or under water, provided with an equipment according to the invention. This equipment schematically illustrated in Fig. 8 comprises One or a group of supersonic sound transmitters $TS_1$; $TS_2$;

One or a group of supersonic receivers $RS_1$; $RS_2$;

Wireless receivers $R_1$; $R_2$; and

Wireless transmitters $T_1$; $T_2$.

$Su$ denotes in Fig. 1 a submarine and $Su'$ the same submarine in another position.

Figure 2:
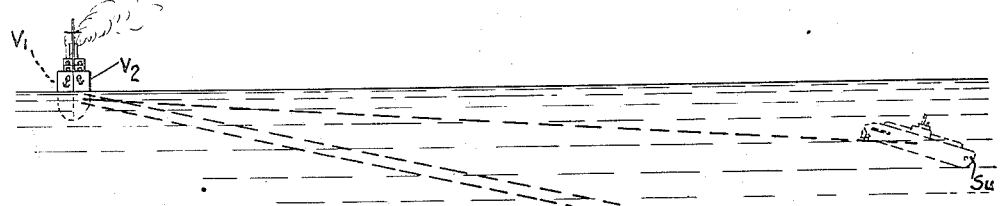
Fig. 2 shows in a vertical section through the sea the respective positions of the ships illustrated in Fig. 1.

In the example illustrated by the drawings $V_1$ and $V_2$ are considered at rest, whilst the submarine $Su$ is supposed moving, including changes of depth of submersion as illustrated in Fig. 2 by two different positions of the submarine.

The aforesaid equipments on the two vessels $V_1$ and $V_2$ are working in such a way, that with the help of the measurement of the distances $d_1$ and $d_2$ (Fig. 3) of the submarine $Su$ from the two vessels $V_1$ and $V_2$ by supersonic waves and the application of these measurements on the two components of the telautograph T (Fig. 4) the curve C (Fig. 3) of the course of the submarine is recorded on a surface S (Figs. 3, 4, 9) provided with a system of rectangular coordinates determining latitude and longitude of the submarine. The devices for the observation of eventual sudden changes of depth of the submarine will be described later.

The equipment of the measurement of the distances $d_1$ and $d_2$ and the application of these measurements on the two components of the telautograph system T is shown in greater detail in Fig. 4. The stylus of the telautograph is denoted with number 1, operated in a known manner by the two systems of levers 2, 3 and 2', 3' driven by the motor-like apparatuses 4 and 4'. The stylus is recording on the surface S mentioned above. These motor-like apparatuses are operated according to the invention by electric currents through the wires 150 and 150' regulated in their intensities by variable resistances $W_1$ and $W_2$, respectively $W_1'$ and $W_2'$.

Figure 3:
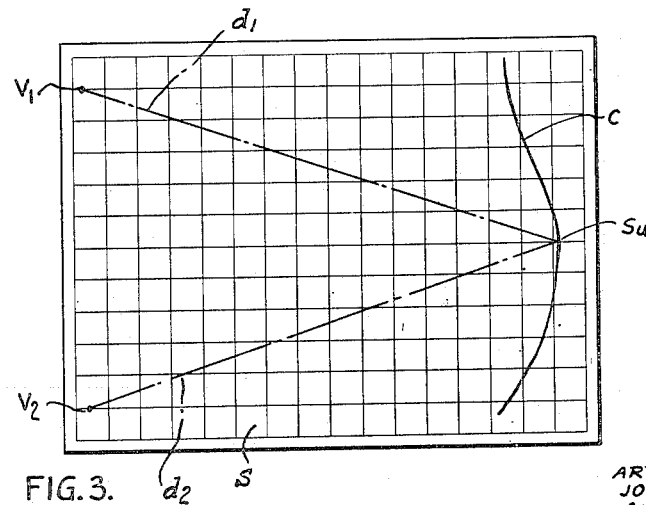
Fig. 3 shows the record of the course of the submarine as it can be obtained by the device according to the invention assuming that the two observer ships are at rest and the submarine is moving.

According to the invention regulation of said resistances is performed automatically in relation to the measurement of the distance $d_1$ and $d_2$ (Fig. 3). These distances are proportional to the time taken by the sound waves to go from their sources to the submarine $S_u$ and back.

Figure 5:
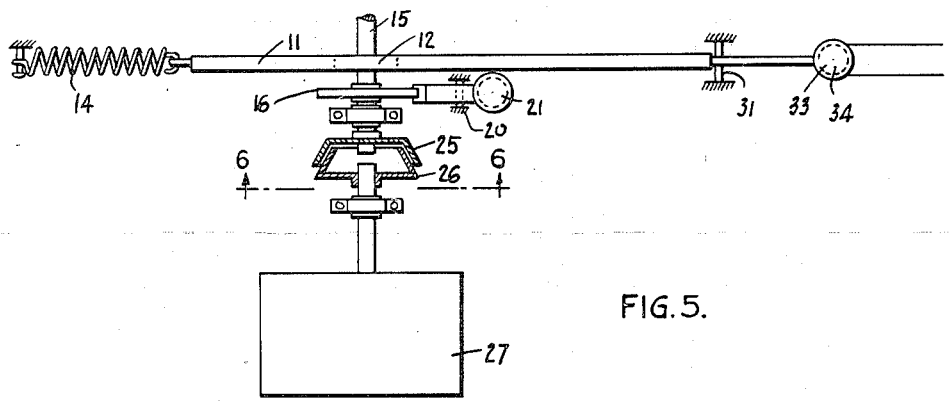
Fig. 5 is a plan view of an auxiliary mechanism of the device by which the two components of the telautograph are regulated.
Figure 6:
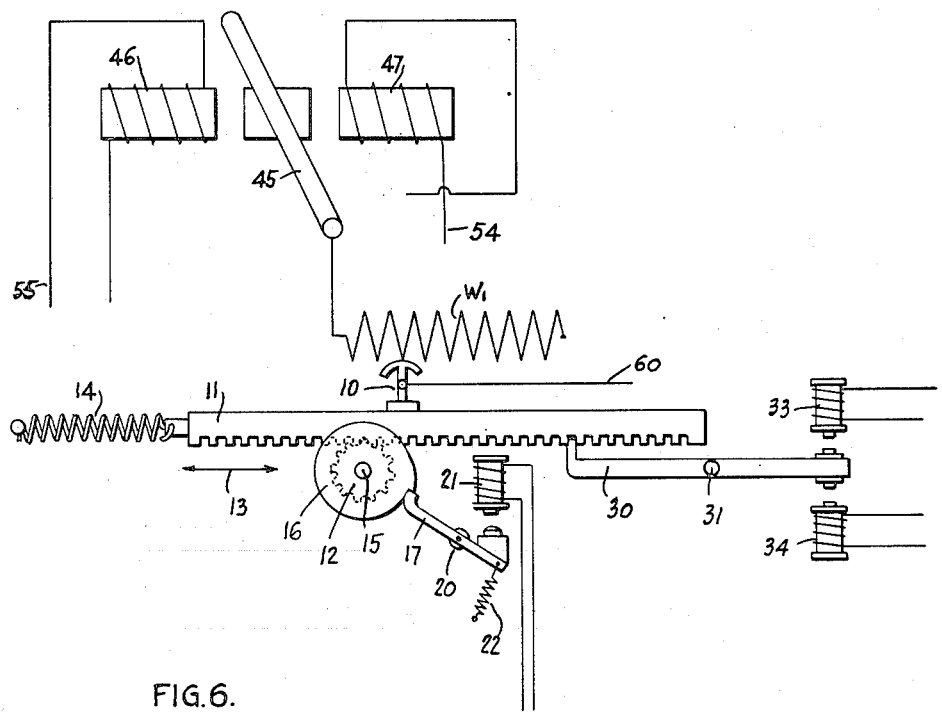
Fig. 6 is a side view of the auxiliary mechanism illustrated in Fig. 5.

The said regulation can be performed by different devices of which one as example is illustrated by Figs. 5 and 6. In Fig. 6 $W_1$ denotes the same resistance $W_1$ as illustrated in Fig. 4 and 10 the same sliding contact as shown in Fig. 4. As shown in Fig. 6 the sliding contact 10 is arranged on a rack 11, which is operated by the pinion 12. The rack 11 is guided by suitable means, not illustrated in the drawings, in the direction 13. On its end a spring 14 is acting. The pinion 12 is fixed on an axis 15, which is provided with a cam disk 16. This cam disk 16 can be locked and released by means of a lever 17 swinging around the axis 20. The other arm of the lever is operated by an electromagnetic relay 21 against the action of the spring 22. The axis 15 is provided with a friction clutch 25, 26 which, in a known manner, may be driven by a motor 27 as long as it is not stopped by an obstacle. On the rear end of the rack 11 is arranged a locking lever 30 having its swinging axis at 31 and being operated on the other end by the two electromagnetic relays 33 and 34. By means of electric circuits to be described later on, the sliding contact 10 begins to move when the sound-wave measuring the distance $d_1$ is emitted. At this moment the electromagnetic relay 21 releases the cam 16. The sliding contact 10 ceases to move when the sound-wave measuring the distance $d_1$ is received. At this moment the electromagnetic relay 34 stops the motion by means of the locking lever 30.

As the sound waves need a certain time to travel from their source and back to the receiver it has been found according to the invention advantageous to make use of the time intervals between transmission and reception of one wave by interpolation of further measurements by means of sound waves of different frequencies, which do not interfere with each other. In Fig. 4 this method is illustrated by the application of a second resistance $W_2$, which is regulated by means of the sliding contact 40 in similar way as the resistance $W_1$ by means of the sliding contact 10.

In order to make use of the variations of the resistances $W_1$ and $W_2$ for the regulations of one component of the telautograph T by means of the motor-like apparatus 4 the resistances are put in circuit with the help of the switches 45 and 50. The switch 45 is operated by two relays 46 and 47. The switch 50 is operated by the relays 51, 52.

The current for the relays 47 and 52 are conducted from the wire 54 over the said relays to the wire 56. The currents for the relays 46 and 51 are conducted from the wire 57 over the said relays to the wire 55. The connection of the wires 54, 55, 56 and 57 with their respective batteries will be described in connection with the specification of Fig. 7.

For the second component of the telautograph by means of the motor-like apparatus 4' analogous devices are provided as explained before for the component by means of the motor-like apparatus 4. The elements of these devices are denoted with the same numerals with additional primes. Thus $W_1$ corresponding to $W_1'$ is a resistance, 10' a gliding contact, etc., etc.

The sliding contacts 10, 10' are connected by the wires 60, 60' to one end of the battery 65, the other end of which is connected to earth. The resistances $W_2$ and $W_2'$ are connected by wires 61 and 61' to one end of the battery 66, the other of which is connected with earth.

As explained above a plurality of resistances of the kind of $W_1$ is made use of and each of these resistances is provided with an auxiliary mechanism of the type illustrated in detail in Fig. 6.

To simplify the description of the general arrangement of the whole device the auxiliary mechanisms and the elements of said device are graphically united in a symbolic way and denoted also with symbolic numerals.

The starting relay 21 with all of its elements (Fig. 6) is in Fig. 7 illustrated only by a single graphic symbol denoted with the symbolic numeral $st_1$. The starting relay corresponding to $W_2$ is denoted in Fig. 7 by $st_2$. The starting relay corresponding to $W_1'$ is denoted by $st_1'$. The starting relay corresponding to $W_2'$ is denoted by $st_2'$. In a similar way the lifting relay 33 (Fig. 6) is denoted in Fig. 7 by $li_1$; therefore the lifting relay corresponding to $W_2$ is denoted $li_2$. The lifting relay corresponding to $W_1'$ is denoted by $li_1'$. The lifting relay corresponding to $W_2'$ is denoted by $li_2'$. The blocking relay 34 (Fig. 6) is denoted in Fig. 7 by $bl_1$; therefore the blocking relay corresponding to $W_2$ is denoted by $bl_2$. The blocking relay corresponding to $W_1'$ is denoted by $bl_1'$. The blocking relay corresponding to $W_2'$ is denoted by $bl_2'$.

The connecting relay 47 (Figs. 4 and 5) is denoted in Fig. 7 by $c_1$. The connecting relay 51 (Fig. 4) is denoted in Fig. 7 by $c_2$. The connecting relay 51' (Fig. 4) is denoted in Fig. 7 by $c_1'$. The connecting relay 47' in Fig. 4 is denoted in Fig. 7 by $c_2'$.

The disconnecting relay 46 (Fig. 4) is denoted in Fig. 7 by $d_1$. The disconnecting relay 52 (Fig. 4) is denoted in Fig. 7 by $d_2$. The disconnecting relay 46' (Fig. 4) is denoted in Fig. 7 by $d_1'$. The disconnecting relay 52' (Fig. 4) is denoted in Fig. 7 by $d_2'$.

In Fig. 7 which illustrates schematically the general arrangement of the detail mechanism of the whole device on the vessel $V_1$ a transmitter $ts_1$ for supersonic waves for a definite frequency is arranged; $ts_2$ denotes a second transmitter for supersonic waves for different frequency of such a kind that the two frequencies cannot interfere. $rs_1$ is a receiver for supersonic waves for the reception of the first frequency. $rs_2$ is a receiver for supersonic waves for the reception of the second frequency. $t_1$ and $t_2$ are two wireless transmitters; $r_1$ and $r_2$ are two wireless receivers.

70 denotes a disk rotated by a motor or clockwork of known construction, not illustrated in the drawings. The disk 70 makes in a desired time interval one revolution. The circumference of this disk is provided with a conducting segment 71 connected by the wires 72, 73 to one end of the battery 74, the other end of which is connected to earth. The remaining part 80 of the circumference is insulated. 81 and 82 are two sliding contacts, making each once in a revolution contact with the segment 71. Each time when the segment 71 makes contact with the sliding contact 81 a current is sent through the wire 90. This current operates the two starting relays $st_1$ and $st_1'$ and causes the wireless transmitter $t_1$ to send a wireless signal to the equipment of the second vessel (Fig. 8), where it is received by the wireless receiver $R_1$ (Fig. 8). The circuit 90 (Fig. 7) is continued from the wireless transmitter $t_1$ to the transmitter of supersonic waves $ts_1$ (Fig. 7) to earth. By passing the sound transmitter the current causes the emission of a supersonic wave of a definite frequency $f_1$.

Each time when the segment 71 (Fig. 7) makes contact with the sliding contact 82 a current is sent through the wire 100. This current operates the two starting relays $st_2$ and $st_2'$ and causes the wireless transmitter $t_2$ to send a wireless signal to the equipment of the second vessel $V_2$ where it is received by the wireless receiver $R_2$ (Fig. 8). The signals given between $t_1$ and $R_1$ on the one side and the signal between $t_2$ and $R_2$ must be of a different kind so that they do not interfere with one another, e. g., signals of different frequency. The aforesaid different signals could also be sent and received respectively by one and the same sender and by one and the same receiver.

The circuit 100 is continued from the wireless transmitter $t_2$ to the transmitter of supersonic waves $ts_2$ (Fig. 7) to earth. By passing the sound transmitter the current causes the emission of the supersonic waves of a frequency $f_2$ different from $f_1$.

In the moment when a wireless signal is received on the second vessel $V_2$ by the wireless receiver $R_1$ (Fig. 8) the transmitter $TS_1$ for supersonic waves emits supersonic waves on the frequency $f_1'$. In the moment when a wireless signal is received on the second vessel $V_2$ by the wireless receiver $R_2$ (Fig. 8), the transmitter $TS_2$ for supersonic waves emits supersonic waves of the frequency $f_2'$, different from $f_1'$.

The reception of the supersonic waves of the frequency $f_1$ reflected from the submarine by the sound receiver $rs_1$ (Fig. 7) serves for closing the interrupter 112 and thereby the circuit 110. The circuit 110 comes from one end of the battery 111, the other end of which is connected to earth. The circuit 110 passes through the disconnecting relay $d_2$ the connecting relay $c_1$ the lifting relay $li_2$ and the blocking relay $bl_1$ to earth.

The reception of the supersonic waves of the frequency $f_2$ reflected from the submarine by the sound receiver $rs_2$ (Fig. 7) serves for closing the interrupter 113 and thereby the circuit 120. This circuit 120 comes from the battery 111 mentioned before. The circuit 120 passes through the disconnecting relay $d_1$, the connecting relay $c_2$, the lifting relay $li_1$ and the blocking relay $bl_2$ to earth.

The reception of the supersonic waves of the frequency $f_1'$ (Fig. 8) reflected from the submarine by the sound receiver $RS_1$ causes the emission of a wireless signal sent from the wireless transmitter $T_1$ and received on the first vessel $V_1$ by the wireless receiver $r_1$ (Fig. 7). The reception of this wireless signal serves for closing the interrupter 130 and thereby the circuit 131. This circuit 131 comes from one end of the battery 132 the other end of which is connected to earth. The circuit 131 passes through the disconnecting relay $d_2'$, the connecting relay $c_1'$, the lifting relay $li_2'$ and the blocking relay $bl_1'$ to earth.

The reception of the supersonic waves of the frequency $f_2'$ (Fig. 8) reflected from the submarine by the sound receiver $RS_2$ causes the emission of a wireless signal sent from the wireless transmitter $T_2$ and received on the first vessel $V_1$ by the wireless receiver $r_2$ (Fig. 7). The reception of the wireless signal serves for closing the interrupter 140 and thereby the circuit 141. This circuit 141 comes from the battery 132 mentioned above. The circuit 141 passes through the disconnecting relay $d_1'$, the connecting relay $c_2'$, the lifting relay $li_1'$ and the blocking relay $bl_2'$ to earth.

By the devices described before the two components of the telautograph T (Fig. 4) corresponding to the distances of the submarine $Su$ from the two vessels $V_1$, $V_2$, are automatically regulated.

According to the invention an additional device is provided to measure certain changes in the reception of the supersonic waves, indicating variations of depth of the submarine and of changes in the direction of the course of the submarine. For this purpose the equipment on the vessel $V_1$ includes two galvanometers $g_1$, $g_2$ (Fig. 7) arranged in such a way that by these galvanometers the intensity of the received waves of the frequencies $f_1$ and $f_2$ (Fig. 7) can be measured. For the same purpose also on the second vessel $V_2$ (Fig. 8) two galvanometers $g_1'$, $g_2'$ are arranged in such a way that by these galvanometers the intensity of the received waves of the frequencies $f_1'$ and $f_2'$ (Fig. 8) can be measured.

If, e. g., the submarine $Su$ (Fig. 2) dives into a lower position $Su'$ the intensity of the received waves suddenly decreases, and this decrease will be automatically registered by said galvanometers.

In order to make such sudden changes obvious, without observing the galvanometers themselves, signal devices of known construction, such as optical or acoustical signals, e. g., bells can be used.

According to a further object of the invention the currents leading through the wires 150 and 150' (Fig. 4) to the motor-like apparatuses 4 and 4' may be used for the automatic direction of the torpedoes to be fired against the submarine from one or the other of the two vessels $V_1$ and $V_2$. For this purpose the circuits 150 respectively 150' are provided with the resistances 151 respectively 151' parallel to which are disposed the amplifiers 153 respectively 153'. By means of these amplifiers 153 and 153' amplified currents are obtained and these currents are conducted through the wires 155 respectively 155' to electric motors, serving in a known manner for the direction of the torpedoes.

Figure 9:
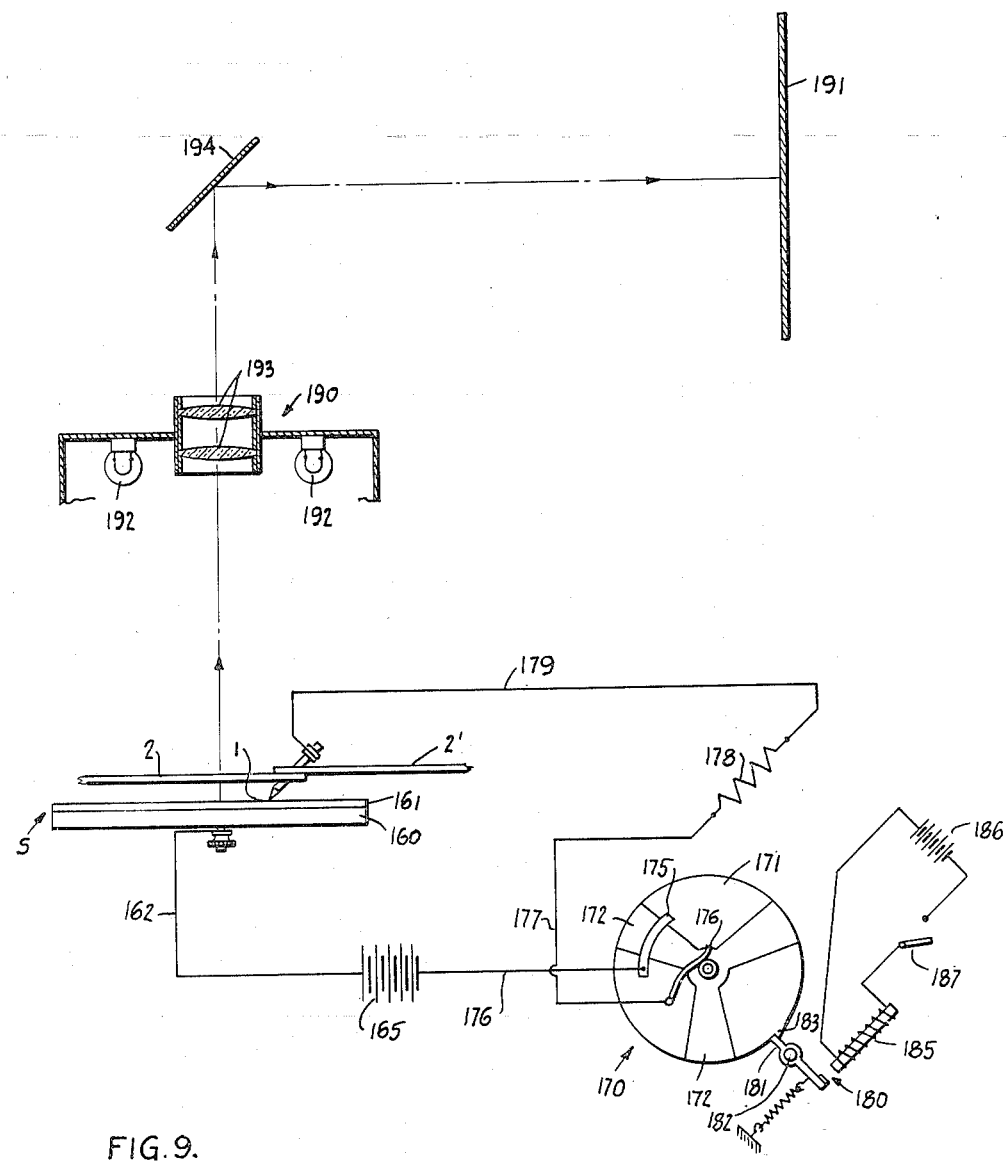
Fig. 9 is a schematic diagram of another auxiliary mechanism producing visible marks of the positions of the submarine in predetermined definite intervals of time.

By the stylus 1 (Fig. 4) of the telautograph T a record is made in a known manner on the surface S. In order to evaluate the positions of the submarine $Su$ in definite time intervals, according to the invention a special device is provided (Fig. 9). This special device comprises a surface S and a stylus of special construction for the purpose to make marks on the surface S in predetermined definite intervals of time. The surface S comprises a metallic plate 160 covered by a paper 161 impregnated with a chemical solution on which the metallic stylus 1 produces by electrolytic action visible marks, when a current passes from the stylus 1 through the paper 161, the metallic plate 160 and the wire 162 to one end of the battery 165. The other end of the battery leads to the interrupter 170. This interrupter comprises a rotating disk 171 carrying a definite number of conducting segments 172. The disk 171 is rotated in known manner by a clockwork or electric motor, not illustrated in the drawings. Each of the conducting segments 172 makes contact in definite time intervals with the sliding contact 175 and closes the circuit of the battery 165 passing through the wire 176, the sliding contacts 175 and 176, the wire 177, the resistance 178 and the wire 179 to the stylus 1. The start of the rotation of the interrupting disk 171 is caused by a releasing relay 180, consisting of a locking lever 181, swinging around the axis 182 and acting on the cam 183 of the disk 171. The locking lever is drawn back from the cam by means of an electromagnet 185, activated by a current of the battery 186 when the interrupter 187 is closed.

Above the surface S (Fig. 9) a projector 190 is arranged by which the record made by the stylus 1 on the surface S is projected on a screen 191. The projector comprises a number of illuminating lamps 192, the enlarging lenses 193 and the mirror 194. The system of coordinates as shown in Fig. 4 (e. g., longitude and latitude) can be arranged on the paper layer 161 (Fig. 9).

In the example of the device described before it was assumed that the two vessels $V_1$ and $V_2$ are at rest. In the case when the vessels $V_1$ and $V_2$ are in parallel motion, means must be provided to move the surface S showing the record in the opposite direction of the movement of the two vessels $V_1$ and $V_2$.

The whole device with the equipment on both vessels $V_1$, $V_2$ operates as follows:

When the contact 71 of the rotating disk 70 (Fig. 7) passes the sliding contact 81 the starting relays $st_1$ and $st_1'$ are activated. A wireless signal is caused to be sent from the wireless transmitter $t_1$ to the receiver $R_1$ on the second vessel $V_2$ where a soundwave (frequency $f_1'$) is emitted by the sound transmitter $TS_1$. From the wireless transmitter $t_1$ the current passes through the wire 90 to the sound transmitter $ts_1$ emitting a soundwave (frequency $f_1$) on the first vessel $V_1$ (Fig. 7).

Such starting signals are given successively in definite time intervals in arbitrary numbers. In the example illustrated in Fig. 7 only two devices for the delivery of such successive starting signals are provided.

If the contact 71 passes over the sliding contact 82 the two starting relays $st_2$ and $st_2'$ are activated (second starting signal). A wireless signal is caused to be sent from the wireless transmitter $t_2$ to the receiver $R_2$ on the second vessel $V_2$ where a soundwave (frequency $f_2'$) is emitted by the sound transmitter $TS_2$. From the wireless transmitter $t_2$ the current passes through the wire 100 to the sound transmitter $ts_2$ emitting a soundwave (frequency $f_2$) on the first vessel $V_1$ (Fig. 7).

The soundwave of the frequency $f_1$ is reflected from the submarine SU and the reflected wave is received on the first ship $V_1$ by the sound receiver $rs_1$.

In the moment of the reception of the soundwave in the receiver $rs_1$ the interrupter 112 is closed and the current passes through the wire 110, the blocking relay $bl_1$ (numeral 34 in Fig. 6) the lifting relay $li_2$, the connecting relay $c_1$ (numeral 47 in Fig. 6) and the disconnecting relay $d_2$, to one end of the battery 111.

In this manner the motion of the rack (Fig. 6) is blocked and the resistance $W_1$ (Fig. 4) gets automatically the value proportional to the distance of the submarine from the vessel $V_1$. The current regulated by the resistance is connected with the motor-like apparatus 4 operating one of the two components of the telautograph T.

In an analogous way by the reception of the soundwave of the frequency $f_1'$ and a wireless signal from the wireless transmitter $T_1$ (Fig. 8) received by the wireless receiver $r_1$ (Fig. 7) the interrupter 130 is closed. Then a current passes through the wire 131 the blocking relay $bl_1'$, the lifting relay $li_2'$, the connecting relay $c_1'$ and the disconnecting relay $d_2'$ to one end of the battery 132.

In this manner the resistance $W_1'$ is automatically regulated proportional to the distance of the submarine SU from the vessel $V_2$. The current regulated by the resistance is connected with the motor-like apparatus 4' operating the second of the two components of the telautograph T.

The devices for the emission and reception of the successive soundwaves with different frequencies operate in an analogous way, so that the regulation of the components of the telautograph occurs as frequently as it seems convenient. Thus the device illustrated in the drawings is only an example in which two successive emissions and reception devices are used.

The means for regulating the resistances $W_1$, $W_2$, etc., may be varied without changing the spirit of the invention. Any device for regulating said resistances may be used operating in accordance with the time the waves require in order to go from the observing vessel to the submarine and back. Also a telautograph of another system than illustrated in the drawing and another system of coordinates can be used.

Instead of the sound waves also electrical waves can be used, especially if the device is used for determining the course of airplanes.

The device described before may also be used for determining the relative position of a reflecting surface under the earth. In such cases in subterranean galleries, tunnels, etc., existing or to be constructed, a plurality of moving vehicles are to be provided, carrying sound transmitters, of known construction. The reception of waves reflected from the deposits of ores, coal, etc., is recorded in a similar way by telautograph as described above.

We claim:

1. An automatically operated object-locating system by means of supersonic waves, which includes transmitters for sending supersonic waves located at two spaced points for the observation of the wave reflecting object to be located, two spaced means at said points for receiving echo waves from the object, electric circuits controlled by said receiving means, variable resistances controlled by said electric circuits to alter said resistances proportionally to the time taken by the waves to go from the transmitters to the wave reflecting object and back, a telautograph with a stylus and electric apparatus governing said stylus, electric circuits controlled by said resistances to operate the elements of the telautograph separately and in accordance with the respective distances from the two spaced observation points to the wave reflecting object, and a plate carrying a surface on which the course of the moving object is recorded by said telautograph.

2. An automatically operated object-locating system by means of supersonic waves, which includes transmitters for sending supersonic waves located at two vessels for determining the position of a submarine, two spaced means on said vessels for receiving echo waves from the submarine, electric circuits controlled by said receiving means, variable resistances controlled by said electric circuits to alter said resistances proportionally to the time taken by the waves to go from the transmitters to the wave reflecting object and back, a telautograph with a stylus and electric apparatus governing said stylus, electric circuits controlled by said resistances to operate elements of the telautograph separately and in accordance with the respective distances from the two spaced observation points to the wave reflecting object, a recording surface on which the stylus of said telautograph moves and makes visible marks, and a coordinate system on said recording surface on which said marks of the stylus are reproduced according to the position of the submarine to be located.

3. An automatic operated object-locating system by means of supersonic waves, which includes a plurality of sound wave transmitters at spaced observation points working with different frequency waves to distinguish them, means at said points for separately receiving said sound waves of different frequencies in successive manner in selected time intervals, electric circuits controlled by said receiving means, variable resistances controlled by electric circuits to alter said resistances proportionally to the time taken by the waves to go from the transmitters to the object and back, a telautograph with a stylus and electric apparatus operating said stylus, electric circuits controlled by said resistances to operate the elements of the telautograph separately and in accordance with the respective distances from the observation points to the object, and a plate carrying a surface on which the course of the moving object is recorded by said telautograph.

4. An automatic operated object-locating system by means of supersonic waves, which includes transmitters for sending supersonic waves located at spaced points for the observation of the object to be located, spaced means at said points for receiving echo waves from the object, electric circuits controlled by said receiving means, variable resistances controlled by said electric circuits to alter said resistances proportionally to the time taken by the waves to go from the transmitters to the wave reflecting object and back, a telautograph with a stylus and electric apparatus governing said stylus, electric circuits controlled by said resistances to operate the elements of the telautograph separately and in accordance with the respective distances from the spaced observation points to the object, a plate carrying a surface on which the course of the moving object is recorded by the telautograph, a projection screen and a projector with enlarging lenses projecting the record made by said telautograph stylus on said screen in an enlarged scale.

5. An automatic operated object-locating system by means of supersonic waves, which includes a plurality of supersonic wave transmitters at spaced observation points working with different frequencies to distinguish them and located on a plurality of vessels for determining the position of a submarine, means on said observing vessels for receiving echo waves of said different frequencies from the submarine in successive manner in selected time intervals, electric circuits controlled by said receiving means, variable resistances in said electric circuits to alter said resistances proportionally to the time taken by the waves to go from the transmitters to the object and back, a telautograph with a stylus and electric apparatus governing said stylus, electric circuits controlled by said resistances to operate the elements of the telautograph separately and in accordance with the respective distances from the observation points to the object, wireless transmitters and wireless receivers on said observer vessels for actuating from one vessel to another the said sound wave transmitters and receivers, and a recording device comprising a plate carrying a surface with a coordinate system for recording the movement of the stylus of the telautograph in accordance with the course of the located submarine.

ARTHUR KORN.
JOSEPH W. HESS.
SIMON L. RUSKIN.